United States Patent
Saito et al.

(10) Patent No.: US 11,108,994 B2
(45) Date of Patent: Aug. 31, 2021

(54) IMAGE DISPLAY SYSTEM AND IMAGE DISPLAY METHOD

(71) Applicant: HITACHI KOKUSAI ELECTRIC INC., Tokyo (JP)

(72) Inventors: Ryuichi Saito, Tokyo (JP); Yohei Yamamoto, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 0 days.

(21) Appl. No.: 17/270,727

(22) PCT Filed: Aug. 20, 2019

(86) PCT No.: PCT/JP2019/032453
§ 371 (c)(1),
(2) Date: Feb. 23, 2021

(87) PCT Pub. No.: WO2020/041566
PCT Pub. Date: Mar. 5, 2020

(65) Prior Publication Data
US 2021/0227180 A1    Jul. 22, 2021

(30) Foreign Application Priority Data

Aug. 27, 2018   (JP) .............................. JP2018-157903

(51) Int. Cl.
*H04N 7/18*        (2006.01)
*B61L 25/02*      (2006.01)
(Continued)

(52) U.S. Cl.
CPC .............. *H04N 7/181* (2013.01); *B61L 25/02* (2013.01); *G06K 9/00771* (2013.01); *G06K 9/209* (2013.01)

(58) Field of Classification Search
CPC .... H04N 7/181; G06K 9/209; G06K 9/00771; B61L 25/02
See application file for complete search history.

(56) References Cited

U.S. PATENT DOCUMENTS 9,591,272 B2 *   3/2017   Shirani ............ G08B 13/19641
9,942,468 B2 *   4/2018   Shirani .................... H04N 7/18
(Continued)

FOREIGN PATENT DOCUMENTS

JP        08244612 A      9/1996
JP        10304346 A     11/1998
(Continued)

OTHER PUBLICATIONS

ISR issued in Int'l. Publication No. PCT/2019/032453, dated Oct. 29, 2019 (with translation).

*Primary Examiner* — Boubacar Abdou Tchoussou
(74) *Attorney, Agent, or Firm* — Greer Burns & Crain Ltd.

(57) ABSTRACT

A monitoring server of a platform-side monitoring system analyzes an image taken by a plurality of platform monitoring cameras installed on a platform, and transmits information on the results of detection to a car-side monitoring system in the case where an object of attention is detected from the image. A control unit of the car-side monitoring system allows the monitor to display an image taken by the car camera which corresponds to the platform monitoring camera that has taken an image of the object of attention in a mode that is different from that of the images taken by the other car cameras on the basis of the information on the results of detection that has been received from the platform-side monitoring system.

7 Claims, 7 Drawing Sheets

(51) Int. Cl.
  *G06K 9/20*   (2006.01)
  *G06K 9/00*   (2006.01)

(56) References Cited

U.S. PATENT DOCUMENTS

| | | | |
|---|---|---|---|
| 10,953,901 B2* | 3/2021 | Tokumaru | B61L 27/0027 |
| 2010/0020175 A1* | 1/2010 | Takada | B61L 15/0081 |
| | | | 348/148 |
| 2014/0055621 A1* | 2/2014 | Shirani | H04N 5/23216 |
| | | | 348/159 |
| 2017/0013237 A1 | 1/2017 | Ito | |
| 2019/0039634 A1* | 2/2019 | Tokumaru | B61L 27/0077 |
| 2020/0280699 A1* | 9/2020 | Omori | H04N 5/2257 |

FOREIGN PATENT DOCUMENTS

| | | | |
|---|---|---|---|
| JP | 2011230750 A | 11/2011 | |
| WO | 2015145736 A1 | 10/2015 | |
| WO | 2018096371 A1 | 5/2018 | |

* cited by examiner

| ID | Name of platform-side camera | Name of car-side camera | Installed location | Rushing detection determination | Wheelchair detection determination | Baby buggy detection determination | White cane detection determination |
|---|---|---|---|---|---|---|---|
| 001 | Platform monitoring camera 001 | Car cameras 001 and 002 | For monitoring platform (first car) | 0 | 1 | 0 | 0 |
| 002 | Platform monitoring camera 002 | Car cameras 001 and 002 | Flight of stairs 1 | 1 | 0 | 0 | 0 |
| 003 | Platform monitoring camera 003 | Car cameras 005 and 006 | Flight of stairs 2 | 0 | 0 | 0 | 0 |
| 004 | Platform monitoring camera 004 | Car cameras 005 and 006 | For monitoring platform (second car) | 0 | 0 | 0 | 0 |

IMAGE DISPLAY SYSTEM AND IMAGE DISPLAY METHOD

This is a National Phase Application filed under 35 U.S.C. § 371, of International Application No. PCT/JP2019032453, filed Aug. 20, 2019, the contents of which are incorporated by reference.

TECHNICAL FIELD

The present invention relates to an image display system for displaying an image on a side of a car of a train at a station platform.

BACKGROUND ART

Conventional image display systems have been put into practice so that a driver or a trainman of a train (hereinafter, these are simply referred to as "trainman") or a member of the station staff can check passengers who are getting on or off a train. Many of the current image display systems are of a type that displays an image taken by a camera installed along a station platform on a monitor on the platform. In addition, image display systems for wirelessly transmitting an image taken by a camera installed along a station platform to a train so that the image can be displayed on a monitor in the train have been proposed (see Patent Literature 1). Furthermore, in recent years, image display systems of such a type where a camera is attached to a side of a car of a train so that an image of the camera can be displayed on a monitor in the train have been developed.

PRIOR ART LITERATURE

Patent Literature

Patent Literature 1: JPH10-304346 (A)

SUMMARY OF THE INVENTION

Problems to be Solved

In an image display system of the conventional type, an image that has been taken at a set image angle is cut out in a range that can be displayed on a monitor. In addition, the display region of a monitor is limited, and therefore, the size of the image taken by each camera is made small in order for images taken by a plurality of cameras to be collectively displayed. In this case, such a problem arises that it is difficult to confirm the place of an image from a camera. Under this circumstance, failures of noticing a passenger who is rushing into a car, a passenger in a wheelchair, a passenger who is pushing a baby buggy, or a passenger who is holding a white cane (a visually handicapped passenger) can happen.

The present invention has been made in view of the above-described conventional situation, and an object thereof is to provide an image display system where it is possible for a trainman to be able to efficiently monitor an object of attention to whom it is necessary to pay attention on a station platform.

Solution to Problems

In order to achieve the above-described object, the image display system according to the present invention is formed as follows.

The image display system according to the present invention is provided with a car-side monitoring system and a platform-side monitoring system in such a manner that the two can be mutually and wirelessly communicable. The car-side monitoring system has a plurality of car cameras attached to the cars of a train and a monitor for displaying the images taken by the car camera. The platform-side monitoring system has a plurality of platform monitoring cameras installed on a station platform and an image analysis unit for transmitting information on the results of detection to the car-side monitoring system in the case where an object of attention is detected from an image taken by the platform monitoring camera when the image is analyzed. The car-side monitoring system additionally has a display control unit for displaying an image taken by the car camera that corresponds to the platform monitoring camera which has taken an image of an object of attention on the monitor in a mode that is different from that of the images taken by the other car cameras on the basis of the information on the results of detection that has been received from the platform-side monitoring system.

Such a configuration makes it possible for an object of attention to be efficiently detected by using an image taken by the platform monitoring camera, and at the same time can allow the trainman's line of sight to be quickly directed to the image taken by the car camera that corresponds to the platform monitoring camera image. Accordingly, it becomes possible for a trainman to efficiently monitor an object of attention to whom it is necessary to pay attention on a station platform (a passenger who is behaving in a dangerous manner, a passenger who needs support to get on a train, or the like).

Here, an example of the configuration may be provided where the image analysis unit uses a table where the corresponding relationships between the plurality of platform monitoring cameras and the plurality of car cameras are set in order to specify the car camera that corresponds to the platform monitoring camera which has taken an image of an object of attention and transmits the information on the results of detection that includes the identification information of the specified car camera, and the image control unit allows the monitor to display the image taken by the car camera that matches to the identification information included in the information on the results of detection in a mode that is different from that of the images taken by the other car cameras.

Another example of the configuration may be provided where the image analysis unit transmits the information on the results of detection that includes the identification information of the platform monitoring camera which has taken an image of an object of attention, and the display control unit uses a table where the corresponding relationship between the plurality of platform monitoring cameras and the plurality of car cameras are set in order to specify the car camera that corresponds to the platform monitoring camera which matches the identification information included in the information on the results of detection, and allows the monitor to display the image taken by the specified car camera in a mode that is different from that of the images taken by the other car cameras.

In these examples of the configuration, it is preferable for the table as described above to be prepared for each combination of the station platform and the type and the number of cars of the train that stops at the platform in such a manner that the table that corresponds to the platform at which the train has stopped and the type and the number of cars of the train is selected for use.

It is also preferable for the image analysis unit to further identify the type of an object of attention so as to transmit the information on the results of detection that includes the specified type in the case where the object of attention is detected from an image taken by a platform monitoring camera and for the display control unit to allow the monitor to display the image taken by the car camera that corresponds to the platform monitoring camera which has taken the image of the object of attention in a mode that can identify the type of the object of attention.

Advantageous Effects of the Invention

The image display system according to the present invention makes it possible for a trainman to efficiently monitor an object of attention to whom it is necessary to pay attention on a station platform.

DESCRIPTION OF EMBODIMENTS

One embodiment of the present invention is described in reference to the drawings.

Figure 2:
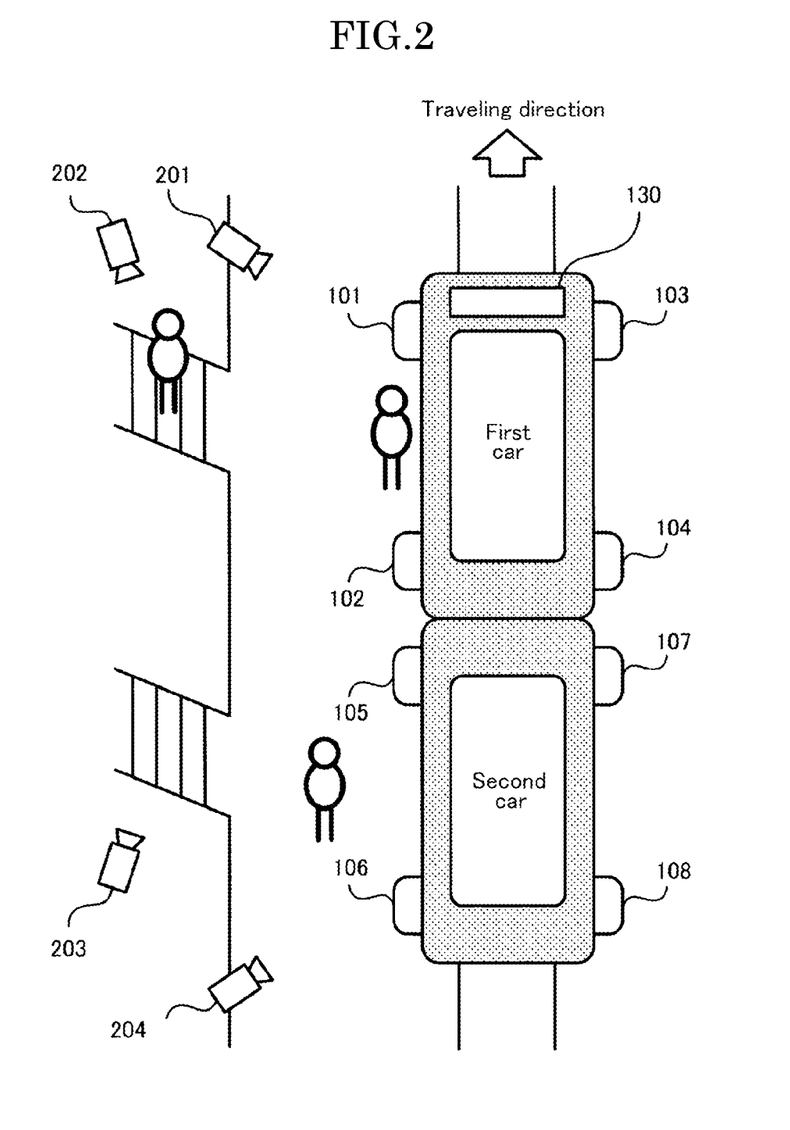
FIG. 2 is a diagram showing an example of the arrangement of car cameras and platform monitoring cameras.

The following description refers to an example of a train that is formed of two cars which are connected to each other as shown in FIG. 2; however, needless to say, there is no limit to the number of cars of a train with which the image display system according to the present invention is equipped.

Figure 1:
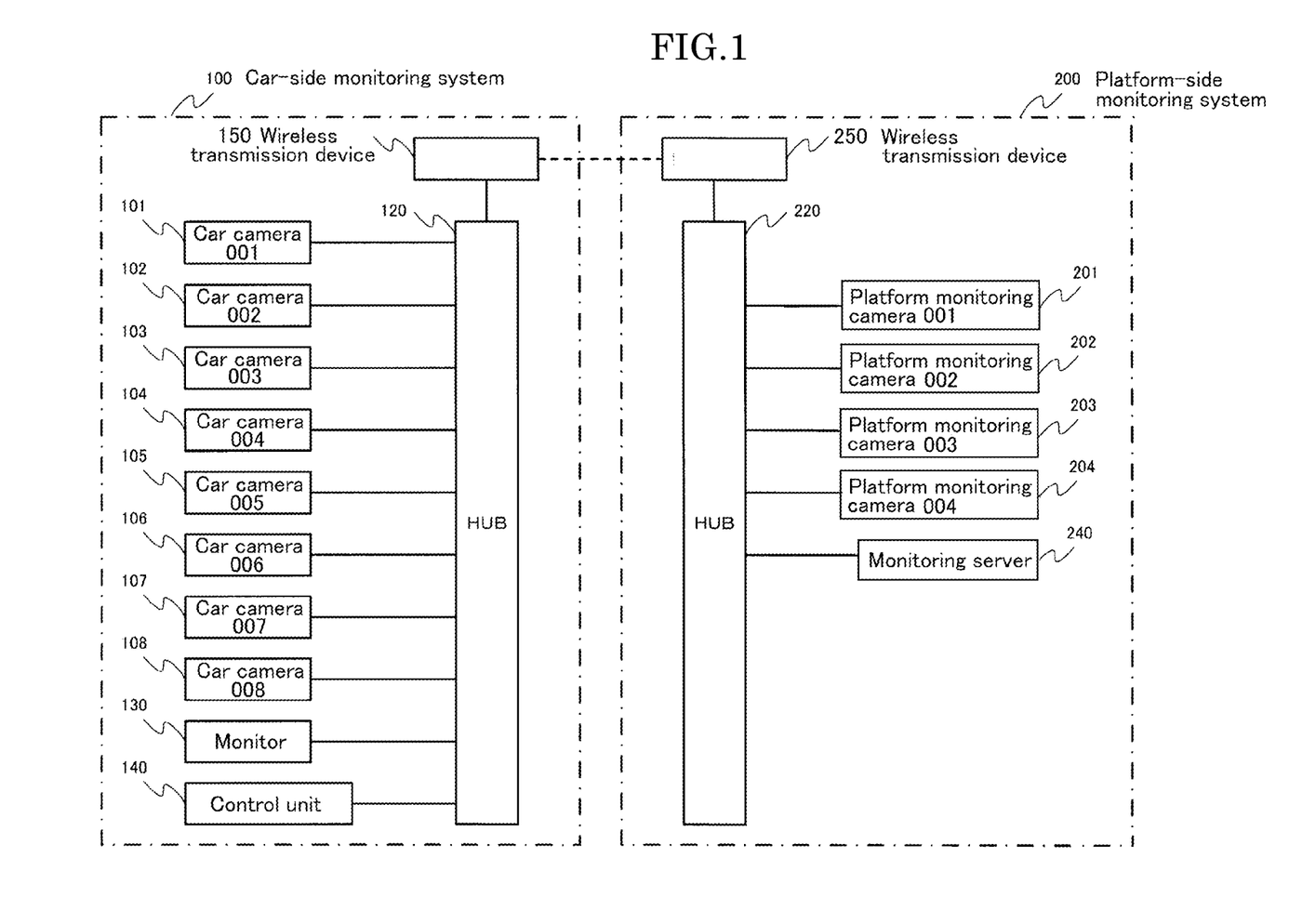
FIG. 1 is a schematic diagram showing an example of the configuration of the image display system according to one embodiment of the present invention.

FIG. 1 schematically shows an example of the configuration of the image display system according to one embodiment of the present invention. FIG. 2 shows an example of the arrangement of car cameras and platform monitoring cameras. The image display system of the present example is provided with a car-side monitoring system 100 that is built on a train side and a platform-side monitoring system 200 that is built on a station platform side.

The car-side monitoring system 100 has car cameras 101 through 108, a switching hub (HUB) 120, a monitor 130, a control unit 140, and a wireless transmission device 150. The car cameras 101 through 108, the monitor 130, the control unit 140, and the wireless transmission device 150 are connected to each other so as to be mutually communicable via the switching hub 120.

The platform-side monitoring system 200 has platform monitoring cameras 201 through 204, a switching hub (HUB) 220, a monitoring server 240, and a wireless transmission device 250. The platform monitoring cameras 201 through 204, the monitoring server 240, and the wireless transmission device 250 are connected to each other so as to be mutually communicable via the switching hub 220.

In the car-side monitoring system 100 in FIG. 1, the respective apparatuses (101 through 108, 130, 140, and 150) are connected to one switching hub 120; however, this is merely shown for the purpose of convenience in order to simplify the drawing, and in reality, a switching hub is generally provided for each car. The switching hub in each car is connected to the switching hub in each adjacent car through a network cable. Thus, the switching hubs equipped in the adjacent cars are connected so as to form an in-train network.

In the platform-side monitoring system 200 in FIG. 1, the respective apparatuses (201 through 204, 240, and 250) are connected to one switching hub 220; however, this is merely shown for the purpose of convenience in order to simplify the drawing, and the configuration can use a plurality of switching hubs.

The car cameras 101 through 108 are attached to the respective corresponding portions of the cars of the train. In the example in FIG. 2, the car cameras 101 through 104 are provided in the first car that is on the front side relative to the direction in which the train travels, and the car cameras 105 through 108 are provided in the second car that is on the rear side relative to the direction in which the train travels. In addition, the car cameras 101 and 105 are attached to the front portions of the cars on the left side so as to be directed toward the rear side, the car cameras 102 and 106 are attached to the rear portions of the cars on the left side so as to be directed toward the front side, the car cameras 103 and 107 are attached to the front portions of the cars on the right side so as to be directed toward the rear side, and the car cameras 104 and 108 are attached to the rear portions of the cars on the right side so as to be directed towards the front side. Here, the locations in which the car cameras 101 through 108 are installed are not limited to those in the present embodiment, and the installation locations may be any as long as the passengers who are getting on or off the cars can be monitored.

Various types of imaging devices that are provided with an image sensor such as CCD (Charge-Coupled Device) or CMOS (Complementary Metal-Oxide Semiconductor) can be used as the car cameras 101 through 108.

The monitor 130 is installed within a cabin so that a trainman can confirm the images of the car cameras on the spot. In the present example, the monitor 130 is installed only in the first car that has a cabin; however, a monitor may be installed in another car in the case where the car also has a cabin. In the present example, eight car cameras 101 through 108 are connected to one monitor 130; however, there are no limitations to the number of car cameras or the number of monitors.

The control unit 140 is a device that receives from the outside a traveling direction instruction that instructs the direction in which the train travels, and a door opening or closing instruction that instructs the opening or closing of doors, and controls the display on the monitor 130 by using these pieces of information. The traveling direction indication and the door opening or closing indication are transmitted from a higher rank device such as a TMS (Train Management System) for managing the operation of a train. In the present example, the control unit 140 is installed in the first car; however, alternatively or additionally, a control unit 140 may be provided in other cars.

The platform monitoring cameras 201 through 204 are installed in the corresponding places on a platform. In the example in FIG. 2, the platform monitoring camera 201 is installed in a location from which images of the location at which the first car stops can be mainly taken, the platform monitoring camera 202 is installed in a place from which images of the first flight of stairs that is close to the location at which the first car stops can be mainly taken, the platform monitoring camera 203 is installed in a place from which images of the second flight of stairs that is close to the location at which the second car stops can be mainly taken, and the platform monitoring camera 204 is installed in a place from which images of the location at which the second car stops can be mainly taken.

Various types of imaging devices provided with an image sensor such as a CCD or a CMOS can be used as the platform monitoring cameras 201 through 204.

The monitoring server 240 carries out a process for analyzing the images taken by the platform monitoring cameras 201 through 204 so as to detect a predetermined object of attention from the images. The object of attention to be detected is a passenger to whom it is necessary to pay attention on a platform, and a passenger who is rushing into a car, a passenger in a wheelchair, a passenger who is pushing a baby buggy, a passenger who is holding a white cane (visually handicapped person), and the like can be cited as examples thereof. In the case where an object of attention is detected, the monitoring server 240 transmits the information on the results of detection to the car-side monitoring system.

The wireless transmission device 150 in the car-side monitoring system 100 and the wireless transmission device 250 in the platform-side monitoring system 200 are configured so as to be mutually communicable in a predetermined wireless communication system. The wireless transmission devices 150 and 250 may be able to communicate at least during the time when a train is stopping at the platform; however, the general configuration thereof makes communication possible during a period that includes the time before a train stops or after a train has departed (that is, period during which a train is within a predetermined distance from the station).

Figure 3:
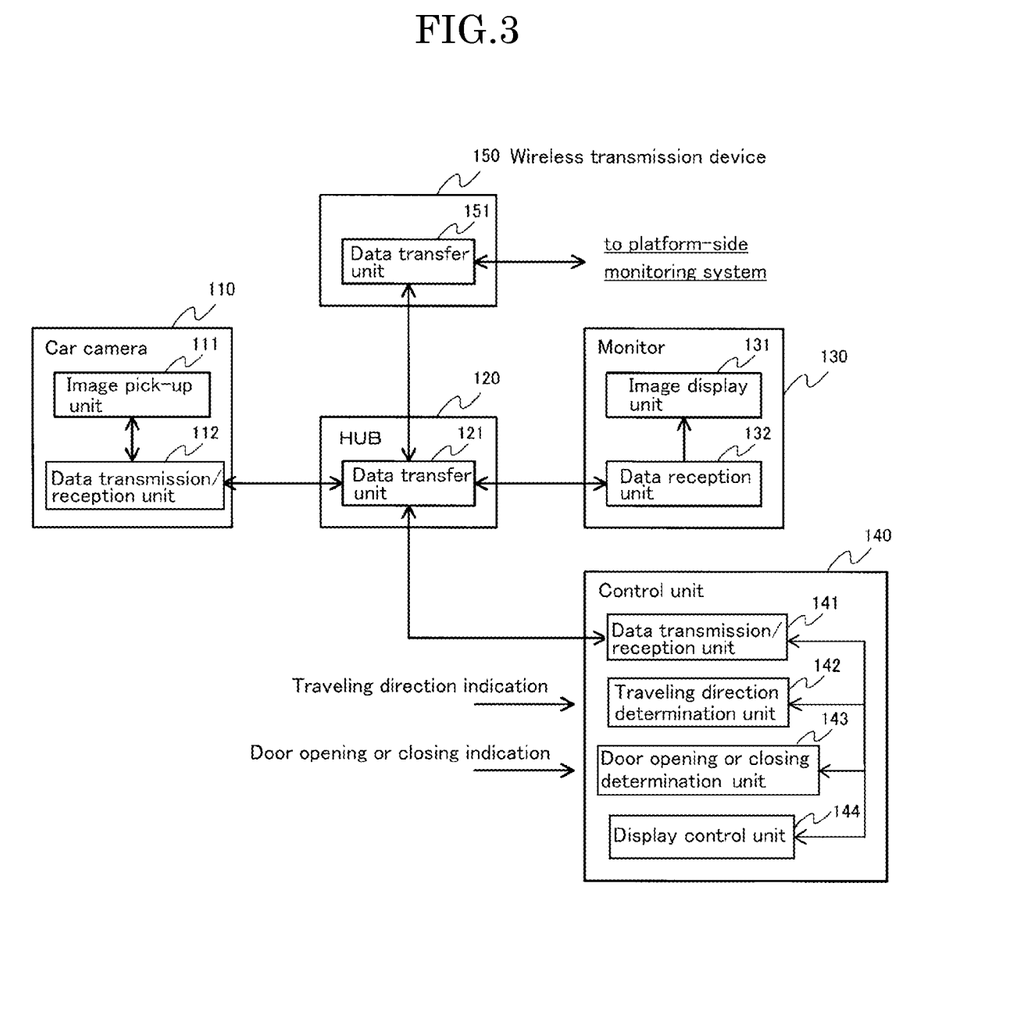
FIG. 3 is a diagram showing an example of function blocks of the car-side monitoring system.

FIG. 3 shows an example of a function block of the car-side monitoring system 100 in the image display system in FIG. 1. Here, the car camera 110 in FIG. 3 corresponds to any of the car cameras 101 through 108 in FIG. 1. In the following, the car cameras 101 through 108 are represented by and denoted as the car camera 110 as long as it is not necessary to differentiate them from each other.

Figure 4:
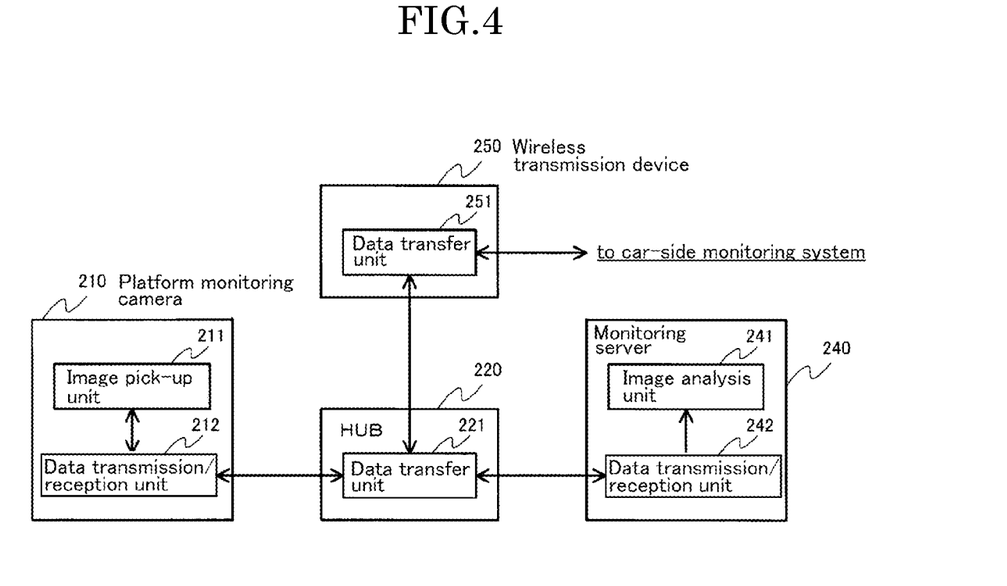
FIG. 4 is a diagram showing an example of function blocks of the platform-side monitoring system.

FIG. 4 shows an example of the function block of the platform-side monitoring system 200 in the image display system in FIG. 1. Here, the platform monitoring camera 210 in FIG. 4 corresponds to any of the platform monitoring cameras 201 through 204 in FIG. 1. In the following, the platform monitoring cameras 201 through 204 are represented by and denoted as the platform monitoring camera 210 as long as it is not necessary to differentiate them from each other.

The car camera 110 is provided with an image pick-up unit 111 and a data transmission/reception unit 112. The image pick-up unit 111 takes images in the vicinity of a side of a car. The data transmission/reception unit 112 transmits the image data acquired by the image pick-up unit 111 to the monitor 130.

The monitor 130 is provided with an image display unit 131 and a data reception unit 132. The data reception unit 132 receives the image data transmitted from the car camera 110 and the data of display patterns transmitted from the control unit 140. The image display unit 131 displays on the screen the image data received from the car camera 110 in accordance with the image pattern indicated from the control unit 140.

The control unit 140 is provided with a data transmission/reception unit 141, a traveling direction determination unit 142, a door opening or closing determination unit 143, and a display control unit 144. The data transmission/reception unit 141 receives the data of the results of image detection that has been transmitted from the monitoring server 240, and transmits the data of the display pattern that has been determined by the display control unit 144 to the monitor 130. The traveling direction determination unit 142 receives a traveling direction indication from the outside so as to determine the direction in which the train travels. The door opening or closing determination unit 143 receives a door opening or closing indication from the outside so as to determine the side on which the doors are to be opened or closed. The display control unit 144 determines the display pattern on the monitor 130 on the basis of the direction in which the train travels that has been determined by the traveling direction determination unit 142, the side on which the doors are to be opened or closed that has been determined by the door opening or closing determination unit 143, and the results of image analysis that have been received from the monitoring server 240.

In the present system, the display area on the monitor 130 is divided into a plurality of areas so that a plurality of camera images that have been taken by the car cameras 110 provided on one side of a train can be displayed simultaneously. In addition, the display control unit 144 determines the display pattern where the images from a plurality of car cameras 110 on the side where the doors are to be opened or closed are arranged in the respective areas on the display of the monitor 130 in such an order that the trainman can easily perceive the monitored areas that correspond to the respective car cameras 110. In the case where the display area on the monitor 130 is divided into a plurality of areas in the upward and downward direction and in the left to right direction, for example, the images from the respective car cameras 110 in the order from the front to the rear relative to the direction in which the train travels are allocated to the respective sections in the order from the upper left to the lower right on the monitor 130.

Furthermore, in the case where the results of image analysis that have been received from the monitoring server 240 confirm the detection of an object of attention from an image taken by any of the platform monitoring cameras 210, the display control unit 144 determines a display pattern where the image taken by the car camera 110 that corresponds to the platform monitoring camera 210 which has taken the image showing the object of attention is displayed in a display mode that is different from that of the images taken by the other car cameras 110. Accordingly, the display patterns that are determined by the display control unit 144 are accompanied by not only the identification information of the car cameras 110 that are allocated to the respective areas divided from the display area on the monitor 130, but also the identification information of the car camera 110 (or area) that has taken the image to be shown in a display mode that is different from that of the other images.

The switching hub 120 is provided with a data transfer unit 121. The data transfer unit 121 relays data that is transmitted or received between apparatuses within its own system (car-side monitoring system 100).

The wireless transmission device 150 is provided with a data transfer unit 151. The data transfer unit 151 relays data that is transmitted or received between an apparatus within its own system (car-side monitoring system 100) and an apparatus within another system (platform-side monitoring system 200).

The platform monitoring camera 210 is provided with an image pick-up unit 211 and a data transmission/reception unit 212. The image pick-up unit 211 takes images on the platform. The data transmission/reception unit 212 transmits the image data that has been acquired by the image pick-up unit 211 to the monitoring server 240.

The monitoring server 240 is provided with an image analysis unit 241 and a data transmission/reception unit 242. The data transmission/reception unit 242 receives the image data that is transmitted from the platform monitoring cameras 210 and transmits the data of the results of image analysis by the image analysis unit 241 to the control unit 140 in the car-side monitoring system 100. The image analysis unit 241 analyzes the image data that has been received from the platform monitoring camera 210. The processing details of the image analysis unit 241 are described below.

The switching hub 220 is provided with a data transfer unit 221. The data transfer unit 221 relays data that is transmitted or received between apparatuses within its own system (platform-side monitoring system 200).

The wireless transmission device 250 is provided with a data transfer unit 251. The data transfer unit 251 relays data that is transmitted or received between an apparatus within its own system (platform-side monitoring system) and an apparatus within another system (car-side monitoring system 100).

Next, the processing details of the image analysis unit 241 are described.

The image analysis unit 241 analyzes the image data that has been received from the platform monitoring cameras 210 so as to detect an object of attention from the images (a passenger who is rushing into a car, a passenger in a wheelchair, a passenger who is pushing a baby buggy, or a passenger who is holding a white cane, for example). In this image analysis, a passenger detection process for detecting a passenger that is included in an image and a characteristic detection process for detecting a characteristic of the passenger are carried out. As examples of the characteristics of a passenger that is detected in the characteristic detection process, the direction in which the passenger moves, the moving speed of the passenger, and a thing that accompanies the passenger (that is, a thing that moves together with the passenger) can be cited.

In the case where the moving direction of a passenger is a direction toward the train and the moving speed is a predetermined value or greater on the basis of the results of the passenger detection process and the characteristic detection process, the image analysis unit 241 detects the passenger as a "passenger who is rushing into a car." In the case where the moving direction of a passenger is a direction toward the train and a thing that accompanies the passenger is a wheelchair, the passenger is detected as a "passenger in a wheelchair." A "passenger who is pushing a baby buggy" and a "passenger who is holding a white cane" are detected in the same manner. Here, the above-described processes are exemplary, and an object of attention may be detected by analyzing the images by means of another technique.

Figure 5:
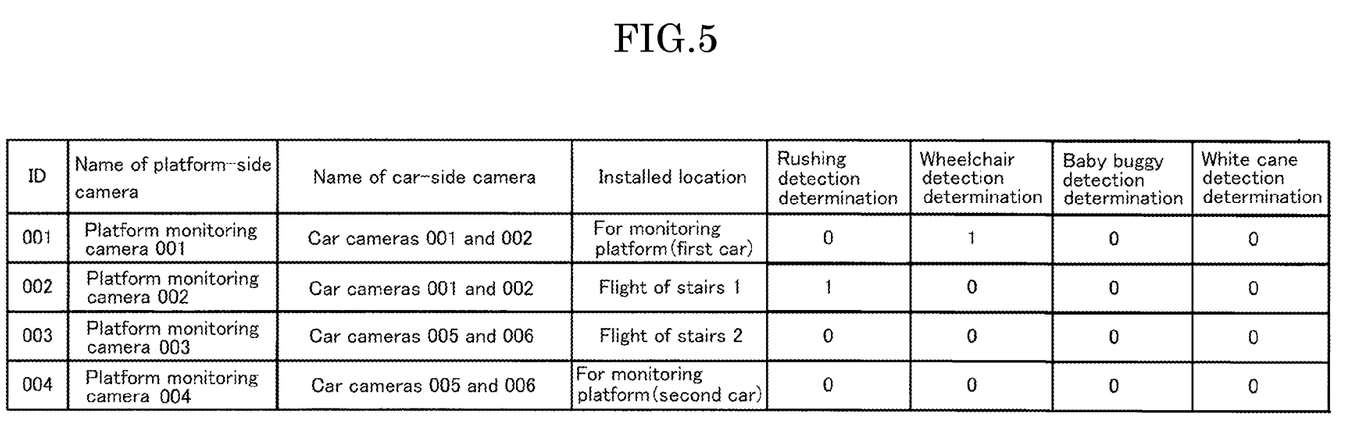
FIG. 5 shows an example of a determination table for detecting an object of attention.

The image analysis unit 241 has a determination table for detecting an object of attention as shown in FIG. 5, and the results of detection are reflected in the determination table every time an object of attention is detected from the images taken by the platform monitoring cameras 210.

The determination table in FIG. 5 has items "ID," "name of platform-side camera," "name of car-side camera," "installed place," "rushing detection determination," "wheelchair detection determination," "baby buggy detection determination" and "white cane detection determination." In the "ID," unique values are allocated. In the "name of platform-side camera," the name of the installed platform monitoring camera 210 is registered. In the "name of car-side camera," the name of the car camera 110 that corresponds to the platform monitoring camera 210 is registered. Instead of the "name of platform-side camera" and "name of car-side camera," other identification information with which the respective cameras can be uniquely specified (camera number, for example) may be registered. In the "installed place," information that indicates the place where the platform monitor camera 210 is installed is registered. In the "rushing detection determination," "wheelchair detection determination," "baby buggy detection determination" and "white cane detection determination," the results of detection of an object of attention are registered. Concretely, in the case where an object of attention that corresponds to the item is detected, '1' is set, and in the case of no detection, '0' is set.

In the example in FIG. 5, two car cameras 110 correspond to one platform monitoring camera 210. This is because the arrangement allows one platform monitoring camera 210 to cover the range that can be monitored by two car cameras 110 on one side of one car. Here, the corresponding relationship of "1:2" in the present example is merely exemplary, and it is needless to say that the arrangement of the platform monitoring cameras 210 and the car cameras 110 can be provided in other corresponding relationships such as "1:N" or "M:1."

The corresponding relationship between the platform monitoring cameras 210 and the car cameras 110 differs depending on the type of station platform or train and the number of cars, and therefore, the determination table that corresponds to the type of station platform or train and the number of cars is used. That is to say, a determination table is prepared in advance for each combination of a station platform, the type of train that stops at the platform, and the number of cars. The determination table that corresponds to the platform at which a train has stopped, the type of train, and the number of cars is selected and used for the following processes. In the case where one station has a plurality of platforms, a different determination table may be used for each platform. The determination table to be used is selected on the basis of the identification information of a train that is transmitted from the car-side monitoring system 200, for example.

Upon the detection of an object of attention from among the images taken by the platform monitoring cameras 210, the image analysis unit 241 reflects the results of detection in the determination table, and at the same time transmits the results of detection of the object of attention (that is, results of image analysis) to the control unit 140 in the car-side monitoring system. In the configuration of the present example, as the results of detection that are transmitted to the control unit 140, the identification information of the car camera 110 that corresponds to the platform monitoring camera 210 that has detected the object of attention is transmitted so that the image taken by the corresponding car camera 110 can be displayed on the monitor 130 in a mode that is different from that of the other car cameras 110 (highlighted display, for example). Here, the type of detected object of attention may be transmitted in addition to the identification information of the car camera 110 so that the display in such a mode that the type of object of attention that has been detected can be recognized is outputted on the monitor 130.

Figure 6:
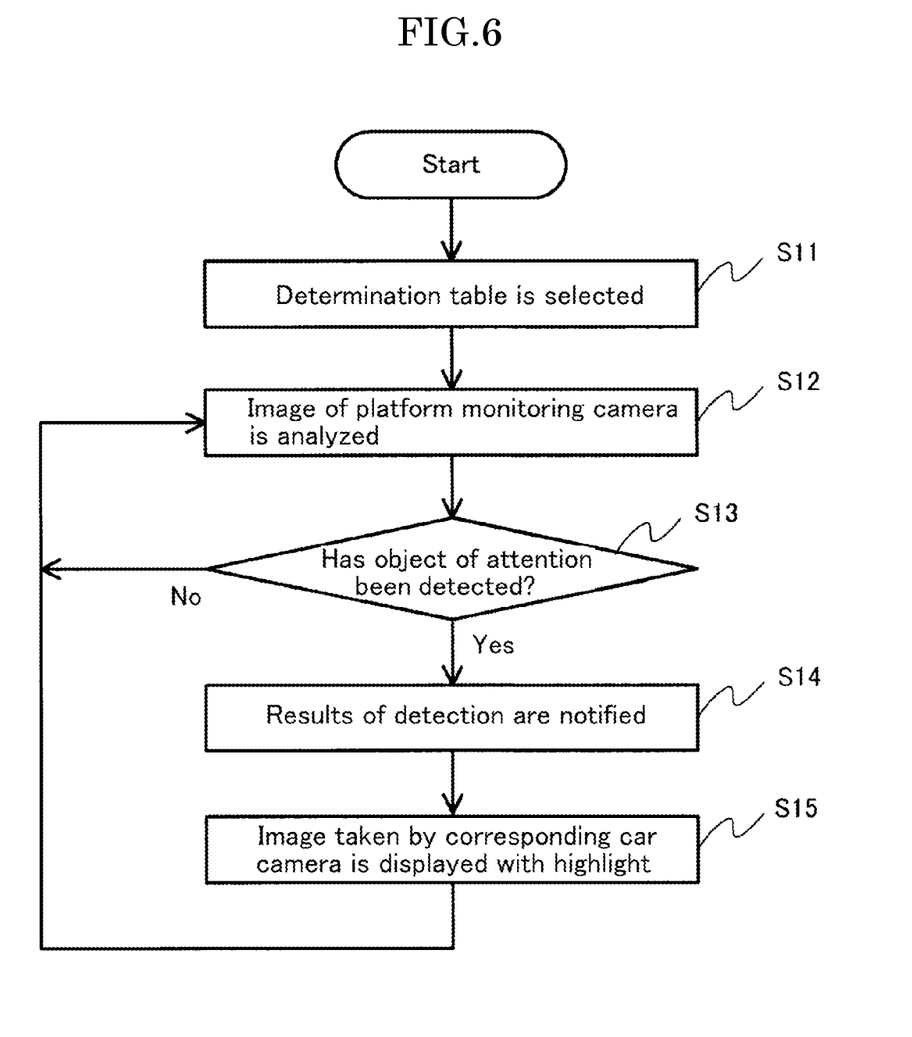
FIG. 6 shows an example of a flowchart for a process flow when a train has stopped at a station platform.

FIG. 6 shows an example of the process flow at the time when a train has stopped at a station platform.

The monitoring server 240 in the platform-side monitoring system 200 receives the identification information of the train from the car-side monitoring system 100 that has been wired to the station platform, specifies the type of train and the number of cars on the basis of the identification information of the train, and selects the determination table in accordance with the type and number of cars (step S11).

Next, the monitoring server 240 analyzes the images taken by the platform monitoring cameras 210 so as to detect an object of attention (step S12) and determines whether or not there is an object of attention (step S13). As a result, in the case where an object of attention has been detected, the results of detection are notified to the control unit 140 in the car-side monitoring system 100 (step S14). Upon reception of the results of detection from the monitoring server 240, the control unit 140 specifies the car camera 110 that corresponds to the platform monitoring camera 210 that has taken the image of the object of attention, determines the display pattern where the image is highlighted from among the images taken by the other car cameras 110, and transmits the data thereof to the monitor 130 (step S15). As a result, a specific camera image is displayed with highlight on the monitor 130.

After that, the procedure returns to step S12 and the monitoring server 240 continues analyzing the images taken by the platform monitoring cameras 210.

In the present example, the monitoring processes in steps S12 through S15 are continuously carried out during the period starting from the opening of the doors of the train to the closing of the doors; however, these processes may be carried out during the period starting from the time when the train has stopped to the departure of the train, and thus, it is a workshop modification of design how long the period during which the monitoring is carried out lasts.

In addition, the reception of the identification information of the train in step S11 may be carried out at any time before the start of the above-described monitoring processes. For example, the identification information may be received as soon as the platform-side monitoring system and the car-side monitoring system become mutually communicable or may be received when the train has stopped along the platform. In addition, information on the type of train and the number of cars may be received in place of the identification information of the train, and thus, information that can specify the determination table for detecting an object of attention may be received. In the case where there is a plurality of platforms in one station, the identification information of the platform along which the train is to stop (platform number, for example) may be received from the car-side monitoring system or another system.

Figure 7:
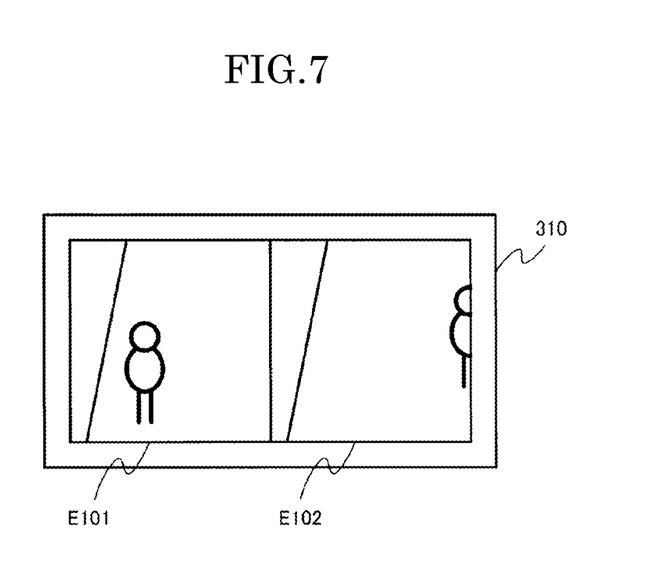
FIG. 7 is a diagram showing a display example under normal conditions on a monitor within a train.
Figure 8:
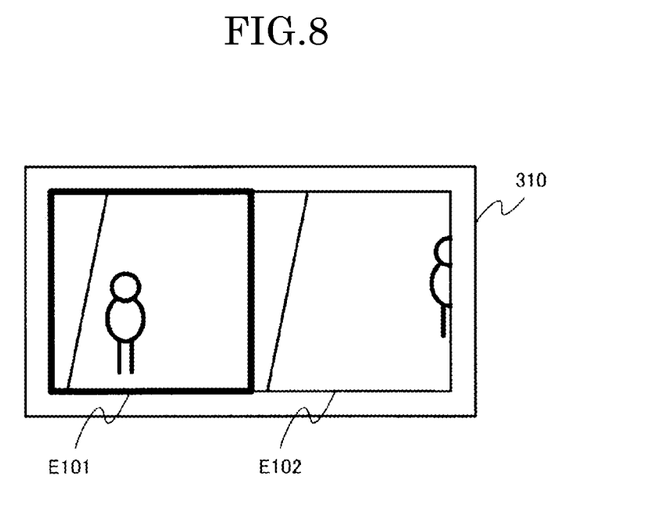
FIG. 8 is a diagram showing a display example at the time of detection of an object of attention on a monitor within a train.

Next, the display on the monitor 130 within the train is described. FIG. 7 is a diagram showing an example of a display on the monitor 130 at a usual time, and FIG. 8 is a diagram showing an example of a display on the monitor 130 at the time when an object of attention is detected. In these drawings, E101 corresponds to an image taken by the car camera 001 (the car camera 101 in FIGS. 1 and 2) that is located in the front portion on the left side of the first car, and E102 corresponds to an image taken by the car camera 005 (the car camera 105 in FIGS. 1 and 2) that is located in the front portion on the left side of the second car. That is to say, in the present example, the display area on the monitor 130 is divided into two so that images taken by the car cameras on the two cars are displayed at the same time.

When an object of attention is detected, as shown in FIG. 8, the image E101 taken by the corresponding car camera is displayed with highlight in a mode that is different from that of the image E102 taken by the other car camera. In the example in FIG. 8, the frame of the image E101 to be displayed with highlight is thicker than the frame of the other image E102; however, the display can be highlighted in accordance with various techniques other than this. For example, the color of the frame of the image 101 may be a stimulating color such as red, an icon that indicates the detection of an object of attention may be attached to the image E101, the size of the image E101 may be larger as compared to that of the image E102 on the display, or any of these may be combined. In the case where the type of the object of attention can be specified, a sequence of letters that indicate the type may be attached, or a mark that imitates the type may be attached, and thus, the type of the object of attention may be able to be perceived by a trainman.

As described above, the image display system in the present example is provided with the car-side monitoring system 100 and the platform-side monitoring system 200 in such a manner that the two are wirelessly communicable with each other. The car-side monitoring system 100 has a plurality of car cameras 110 (101 through 108) attached to the sides of the cars of a train and a monitor 130 for displaying an image taken by the car camera 110. The platform-side monitoring system 200 has a plurality of platform monitoring cameras 210 (201 through 204) installed on a platform and a monitoring server 240 (image analysis unit 241) which analyzes an image taken by the platform monitoring camera 210 and transmits the information on the results of detection to the car-side monitoring system 100 in the case where an object of attention is detected from the image. Furthermore, the car-side monitoring system 100 has a control unit 140 (display control unit 144) for allowing the monitor 130 to display an image taken by the car camera 110 which corresponds to the platform monitoring camera 210 that has taken an image of the object of attention in a mode that is different from that of the images taken by the other car cameras 110 on the basis of the information on the results of detection that has been received from the platform-side monitoring system 200.

Such a configuration makes it possible for an object of attention to be detected efficiently by using images taken by the platform monitoring cameras 210, and at the same time makes it possible for the trainman's line of sight to be quickly directed to the image taken by the car camera 110 that corresponds to the image showing the object of attention. Accordingly, the trainman can pay attention to a passenger who is behaving in a dangerous manner (a passenger who is rushing into a car, for example) or a passenger who needs support for getting into a car (a passenger in a wheelchair, a passenger who is pushing a baby buggy, or a passenger who is holding a white cane) at an early stage, and thus, monitoring can be carried out efficiently. In addition, the platform side monitoring system 200 detects an object of attention, which makes it unnecessary to transmit an image taken by a platform monitoring camera 210 to the car-side monitoring system 100, and therefore, the communication load between the car-side monitoring system 100 and the platform-side monitoring system 200 can be prevented from increasing.

The image display system in the present example has such a configuration where the platform-side monitoring system 200 uses a determination table that defines the corresponding relationship between the plurality of platform monitoring cameras 210 and the plurality of car cameras 110 in order to specify the car camera 110 which corresponds to the platform-monitoring camera 210 that has taken an image of the object of attention, and thus transmits the information on the results of detection that includes the identification information of the specified car camera, and the control unit 140 allows the monitor 130 to display the image taken by the car camera 110 which matches the identification information included in the information on the results of detection in a mode that is different from that of the images 110 taken by the other car cameras.

Such a configuration makes it possible to easily specify the car camera 110 which corresponds to the platform monitoring camera 210 that has taken an image of the object of attention, and thus can lighten the process load.

The image display system in the present example also has such a configuration where the determination table as described above is prepared for each combination of the station platform and the type of train that stops along the platform in addition to the number of cars so that the table can be selected for use in accordance with the platform along which the train has stopped and the type of train in addition to the number of cars.

Such a configuration makes it possible for the car-side monitoring system 100 and the platform-side monitoring system 200 to cooperate, taking into consideration the difference in the structures of the station and the train.

The image display system in the present example also has such a configuration that in the case where an object of attention is detected from an image taken by a platform monitoring camera 210, the monitoring server 240 further identifies the type of the object of attention and transmits the information on the results of detection that includes the thus-identified type, and the control unit 140 allows the monitor 130 to display the image taken by the car camera 110 which corresponds to the platform-monitoring camera 210 that has taken an image of the object of attention in a mode that makes it possible to identify the type of the object of attention.

Such a configuration allows a trainman to be able to easily grasp whether the detected object of attention is a passenger who is behaving in a dangerous manner or a passenger who needs support for getting into a car (in addition, what kind of support for getting into a car is necessary).

Though the present invention is described in detail on the basis of the above embodiments, the present invention is not limited to any of the image display systems that are described herein, and needless to say, the invention can be widely applied to image display systems other than those described above.

For example, the platform-side monitoring system 200 has determination tables in the above-described embodiment; however, the configuration may allow the car-side monitoring system 100 to have determination tables. In this case, such an example may be cited where the monitoring server 240 transmits the information on the results of detection which includes the identification information of the platform monitoring camera 210 that has taken an image of the object of attention, and the control unit 140 uses a determination table so as to specify the car camera 110 which corresponds to the platform monitoring camera 210 that matches the identification information included in the information on the results of detection, and allows the monitor 130 to display the image taken by this car camera 110 in a mode that is different from that of the images taken by the other car cameras 110.

In the case where an object of attention is detected, the display mode of the image taken by the corresponding car camera 110 is changed on the monitor 130 in the above-described embodiments; however, another means may be used in order to draw the attention of a trainman. Concretely, a predetermined alarm sound may be outputted from a speaker or a predetermined alarm lamp may be turned on or made to flash.

The monitor 130 and the control unit 140 are formed in separate bodies in the above-described embodiments; however, the monitor 130 may have the control unit 140 built therein.

The train is formed of two cars for the purpose of simplicity of the description in the above embodiments; however, the train may be formed of more than two cars.

It is also possible for the present invention to be provided as a method or a system for carrying out the processes according to the present invention, a program for implementing such a method or system, a recording medium for storing such a program, or the like.

INDUSTRIAL APPLICABILITY

The present invention can be applied to an image display system for displaying an image of a side of a car of a train at a station platform.

REFERENCE SIGNS LIST

100: train-side monitoring system
101 through 108 and 110: car camera
111: image pick-up unit
112: data transmission/reception unit
120: switching hub
121: data transfer unit
130: monitor
131: image display unit
132: data reception unit
140: control unit
141: data transmission/reception unit
142: traveling direction determination unit
143: door opening or closing determination unit
144: display control unit
150: wireless transmission device
151: data transfer unit
200: platform-side monitoring system
201 through 204 and 210: platform monitoring camera
211: image pick-up unit
212: data transmission/reception unit
220: switching hub
221: data transfer unit
240: monitoring server
241: image analysis unit
242: data transmission/reception unit
250: wireless transmission device
251: data transfer unit

The invention claimed is:
1. An image display system for displaying an image of a side of a car of a train at a station platform, comprising:
   a car-side monitoring system including a plurality of car cameras attached to cars of a train and a monitor for displaying an image taken by a selected car camera; and a platform-side monitoring system including a plurality of platform monitoring cameras installed on a station platform, and an image analysis unit which analyzes an image taken by a selected platform monitoring camera and transmits, in a case where an object of attention is detected from the analyzed image, information on the results of detection to the car-side monitoring system, wherein the car-side monitoring system further comprises a display control unit configured to cause the monitor to display the image taken by the selected car camera that corresponds to the selected platform monitoring camera which has taken the image of the object of attention in a mode that is different from that of the images taken by the other car cameras on the basis of the information on the results of detection that has been received from the platform-side monitoring system.

2. The image display system according to claim 1, wherein the image analysis unit uses a table where corresponding relationships between the plurality of platform monitoring cameras and the plurality of car cameras are defined in order to specify the selected car camera that corresponds to the selected platform monitoring camera which has taken the image of the object of attention, and transmits the information on the results of detection that includes the identification information on the selected car camera, and the display control unit allows the monitor to display the image taken by the selected car camera that matches the identification information included in the information on the results of detection in the mode that is different from that of the images taken by the other car cameras.

3. The image display system according to claim 1, wherein the image analysis unit transmits the information on the results of detection that includes the identification information on the selected platform monitoring camera that has taken the image of the object of attention, and the display control unit uses a table where corresponding relationships between the plurality of platform monitoring cameras and the plurality of car cameras are defined in order to specify the selected car camera that corresponds to the selected platform monitoring camera which matches the identification information included in the information on the results of detection, and allows the monitor to display the image taken by the selected car camera in the mode that is different from that of the images taken by the other car cameras.

4. The image display system according to claim 2, wherein the table is prepared for each combination of the station platform, a type of the train that stops at the platform, and the number of cars of the train, and the table is used in accordance with the platform at which the train has stopped, the type of the train, and the number of cars of the train.

5. The image display system according to claim 3, wherein the table is prepared for each combination of the station platform, a type of the train that stops along the platform, and the number of cars of the train, and the table is used in accordance with the platform at which the train has stopped, the type of the train, and the number of cars of the train.

6. The image display system according to claim 1, wherein in the case where the object of attention is detected from the image taken by the platform monitoring camera, the image analysis unit further identifies a type of the object of attention, and transmits the information on the results of detection that includes the identified type, and the display control unit allows the monitor to display the image taken by the car camera that corresponds to the platform monitoring camera which has taken the image of the object of attention in a mode that can identify the type of the object of attention.

7. An image display method for displaying an image of a side of a car of a train at a station platform, the method comprising:

connecting a car-side monitoring system for allowing a monitor within a train to display images taken by a plurality of car cameras attached to cars of the train and a platform-side monitoring system for analyzing images taken by a plurality of platform monitoring cameras installed on the platform so as to be mutually and wirelessly communicable;

transmitting, by the platform-side monitoring system, in a case where an object of attention is detected from an image taken by a selected platform monitoring camera, information on the results of detection to the car-side monitoring system; and controlling, based on the information on the results of defection received from the platform-side monitoring system, the car-side monitoring system to cause the monitor to display an image taken by a selected car camera that corresponds to the selected platform monitoring camera that has taken the image of the object of attention in a mode that is different from that of the images taken by the other car cameras.

* * * * *